Dec. 24, 1968 P. M. DAVIES 3,418,642

DUAL CONTROL MEMORY MODULES FOR SELF-SEARCHING MEMORY

Filed May 15, 1961 3 Sheets-Sheet 1

PAUL M. DAVIES
INVENTOR.

BY [signature]
AGENT

DUAL CONTROL MEMORY MODULES FOR SELF-SEARCHING MEMORY

Filed May 15, 1961 3 Sheets-Sheet 2

PAUL M. DAVIES
INVENTOR.
BY Gerald Seeger
AGENT

Dec. 24, 1968 P. M. DAVIES 3,418,642

DUAL CONTROL MEMORY MODULES FOR SELF-SEARCHING MEMORY

Filed May 15, 1961 3 Sheets-Sheet 3

PAUL M. DAVIES
INVENTOR.

BY Gerold Siegel
AGENT

United States Patent Office 3,418,642 Patented Dec. 24, 1968

3,418,642
DUAL CONTROL MEMORY MODULES FOR SELF-SEARCHING MEMORY

Paul M. Davies, Manhattan Beach, Calif., assignor, by mesne assignments, to TRW Inc., a corporation of Ohio
Filed May 15, 1961, Ser. No. 109,924
2 Claims. (Cl. 340—173.1)

This invention relates to a memory storage system and more particularly to a self searching memory in which information may be stored and retrieved without the need of specifying an address.

The basic system was first disclosed in co-pending application Ser. No. 76,368, now abandoned, entitled "Self Searching Memory," by Paul M. Davies, and assigned to the same common assignee. The present disclosure represents an improvement in simplifying the structure and extending the capabilities of the system. In particular, the memory cells have been changed to improve certain time constants and a new memory module is used in place of both the original key and the data modules. This new memory module is capable of being used either as a data or a key module. The time constant associated with reading is improved by selecting a record in the absence of resistance in a series network rather than by detecting the presence of resistance in a plurality of networks connected in parallel. Details of the new memory module are more fully described and claimed in co-pending application Ser. No. 110,098, now Patent No. 3,196,407 entitled, "Improvements in Self Searching Memory Systems," and assigned to the same common assignee. The advantages of the present system over the prior art will now be described.

In some prior art memory systems memory cells are assigned consecutive numbers which serve as addresses. In order to write a record into such a memory the address of an empty cell must first be specified. The system decodes this address, which is used to obtain access to the specific memory cell corresponding to the specified address. In magnetic tape memory systems a count-up or count-down addressing system is used in which the tape is read and the cells counted until the specified cell is reached. In core memory systems the specified address controls switching matrices which select the proper memory cell. In all the prior art systems the address of an empty cell must be known beforehand or, in lieu of this, a sequential search must be made in order to find an empty cell which must then be suitably identified.

In order to retrieve information already stored in conventional memory systems it is necessary to either specify the address, which must then be decoded, or a search must be made to find the desired memory cell on the basis of information contained in the record itself. In many applications such a search would require on the average half as many read operations as there are cells in the memory, thereby making such an operation prohibitively expensive and time consuming.

In this invention, as presumably in the case of the human brain, information is stored in a memory cell without specifying a particular memory address. It is required only that at least one memory cell be empty for the information to be recorded. Further, it is not necessary to know which memory cells are full and which memory cells are empty, provided only that a memory cell is available to receive the information to be stored. Reading of information is achieved by specifying key information which is carried as part of the stored record and which uniquely defines the stored record. When this key information is specified, a simultaneous search is made in all memory cells, and the stored record with the matching key information is automatically read-out, there being no requirement to know exactly in which memory cell the information was stored. Details of the circuitry for selecting the defined first memory cell are more fully described and claimed in copending application Ser. No. 76,182, entitled, "Memory Cell Selecting Means."

In the performance of this invention it will be pointed out how cryogenic devices are particularly suited for performing the functions of the self searching memory device due to the infinite ratio of ON resistance (resistive state) to OFF resistance (super-conductive state) thereby permitting complex networks with no attenuation of signal.

Further objects and advantages will be made more apparent as the description progresses, reference now being made to the accompanying drawings wherein.

In order to explain more fully the advantages to be obtained from the present invention, it is thought best at this time to elaborate on the desired functional cooperation of the elements comprising the disclosed device and leave for a later part of the specification the actual disclosure and operation of the individual components.

Figure 1:
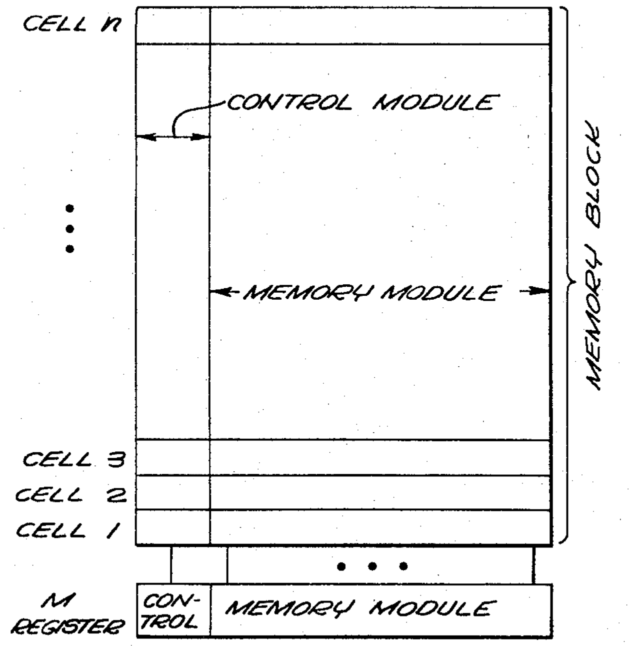
FIG. 1 is a block diagram of a memory storage device.

Referring now to FIG. 1, there is shown a memory block comprising a plurality of individual memory cells each having the capacity to store a complete record. Each memory cell is divided into two parts identified as a control module and a memory module in contra-distinction with the aforementioned copending patent applications that require three parts for each memory cell. Cooperating with the memory block is a single M register for communicating with the individual modules of the memory cells. The vertical lines from the individual modules of the M register interconnect all the memory cells of the memory block and are used to transfer a record to and from the M register and the memory cells of the memory block.

The operation of the memory device will be more apparent by considering a writing operation in which information is caused to transfer from the M register to a memory cell in the memory block. To write information, it is necessary to place a record in the memory module of the M register and transfer this record to the memory module of the first selected memory cell. The control module of the M register is caused to generate control pulses which are directed via the vertical lines associated with all of the individual control modules of all the memory cells, to each control module. Each control module of each memory cell contains a "busy" flip-flop circuit which indicates whether or not that particular memory cell contains a record. The control pulses generated by the control module of the M register, interrogate all busy flip-flops, and by means of logic circuits in every control module, the first empty memory cell as measured from the M register is selected. Having located the first empty memory cell, the record in the M register is transferred into the selected memory cell along the vertical lines interconnecting all memory modules. Once the memory cell is loaded with record information, the busy flip-flop of that memory cell is turned ON to indicate the memory cell is full and hence not available.

In order to read a specified record contained in a full memory cell, it is necessary to load into the memory module of the M register, by information that uniquely identifies the desired record. The control module of the M register generates a read command signal which, together with the key information located in the key module of the M register, is sent to all memory cells in the memory block. The key information is transmitted along the selected vertical lines to all memory modules of the memory block and is simultaneously compared with the information stored in similar portions of all memory modules through which the vertical lines pass. Each bit handling segment compares the stored information with the transmitted information and when the same, a superconducting device remains superconductive, whereas if they differ, the device becomes resistive. Since each bit handling segment has such a device and all of said devices in any given memory module are connected in series, it is only necessary to detect the series path without resistance to select the desired memory cell. Since the key information is unique, only one memory cell will have a true compared signal while all others will have a false compared signal. Once the memory cell is selected the control module generates a read signal which is directed to those individual bit handling segments of the memory module not used for key information for reading the stored information into the M register. It can be seen, therefore, that all memory cells are interrogated simultaneously and that the logic circuits associated with the memory cells themselves and in cooperation with the M register will cause information to be read-out to that portion of the memory module of the M register not previously used for key information.

An important feature of each memory cell is the ability to clear an individual memory cell by simply turning OFF the busy flip-flop in the control module. In operation, clearing is accomplished by placing the key information corresponding to the particular data to be cleared in the M register. A clear control command signal is generated in the control module of the M register, and in a manner similar to that described for the read operation, the individual key modules are interrogated. The true compared signal generated in the selected key module then cooperates with the clear control command signal in the selected control module to turn off the busy flip-flop in that control module.

The advantages of the present invention will become more apparent by considering an example of records being stored for a motor vehicle registry office using filing cards. The individual records may be uniquely defined in terms of license plate number, engine number, body number, name and address of owner or social security number. Obviously a card index may be set up for any preferred heading, however, each heading would require either duplicate cards or crossfiling techniques to locate the actual information card. In the present invention any information that uniquely defines the vehicle or owner may be used as a key, since all the information comprising the record will be recorded in the memory module and any portion of the record can be used as the key.

The suitability of utilizing cryogenic devices in the self searching memory will now be described by considering the nature of the individual components and the functions they must perform. The essential idea of the self searching memory is the use of logic in each memory cell to make the specific selection, whether it be for reading, writing, or clearing. This logic must be performed simultaneously in all cells of the memory if the desired increase in searching speed is to be realized. Of necessity, the circuitry must be complicated, since in the writing operation it is necessary to form a decision at each memory cell that is a function of the busy flip-flops of all previous cells, in order to select the first empty cell. The adaptability of cryogenic devices to this memory system is due mainly to the ability of a gate element to be switched from a superconductive state to a resistive state by the application of a suitable current in a control element held in flux linking relationship with said gate element.

Superconductivity as used in the present invention is the apparent disappearance of electrical resistance at temperatures close to absolute zero. In the study of classical electromagnetism it was expected and predicted that the resistance of an electrical conductor would decrease with a decrease in temperature. The theory indicated that an electric current through a conductor, which consists of the flow of free electrons through the crystal lattice of the molecules forming the conductor, would be affected by the thermal vibration of the atoms comprising the lattice structure. This seemed to indicate that at the higher temperatures the greater thermal activity would increase the probability of collisions between electrons, and hence result in a higher resistivity. Conversely, at the lower temperatures it was expected that the lower thermal activity of the electrons would result in a lowering of the resistance until some finite value was reached. This expected finite value was thought to consist of collisions between the moving electrons forming the electric current flow with the substantially fixed and immobile electrons forming the lattice structure. In addition, it was expected that defects and impurities in the lattice structure would also tend to establish a finite resistance near absolute zero. At 4.2 degrees absolute, the electrical resistance of mercury is known to vanish without even the residual resistance as predicted by the classical theory. For those materials exhibiting superconductivity, the change between the normal conductive state and the superconductive state is very abrupt and occurs at a specific temperature which is different for different materials. The temperature at which the material changes state is termed the transition temperature and is generally only a few degrees above absolute zero. A discussion of the principles of superconductivity and a general listing of materials and compounds that exhibit the property of superconductivity may be found in a book entitled, "Superconductivity," by D. Schoenberg, Cambridge University Press, Cambridge, England, 1952. Certain materials capable of becoming superconductive and their transition temperatures are listed below:

| | ° Kelvin |
|---|---|
| Niobium | 8 |
| Lead | 7.2 |
| Vanadium | 5.1 |
| Tantalum | 4.4 |
| Mercury | 4.1 |
| Tin | 3.7 |
| Indium | 3.4 |
| Thallium | 2.4 |
| Aluminum | 1.2 |

The above-listed transition temperatures apply only when the materials are in a substantially zero magnetic field.

In each material the field strength required to switch the state of the conductor varies with temperature within the range in which the material is superconductive. For example, the metal niobium has a transition temperature of 8 degrees Kelvin at zero field strength, a critical field strength of 2000 oersteds at 4.2 degrees Kelvin, and a critical field strength of 2400 oersteds at 1 degree Kelvin. These field strengths are determined to a large degree by the purity of the material, the mechanical stresses, and upon the general orientation of configuration of the specimen being tested. In certain configurations niobium has been found to have a critical field strength as high as 4000 oersteds at approximately 1 degree Kelvin temperature. At the present time, a popular theory explaining the phenomenon of superconductivity is that a fraction of the total population of current carrying electrons is paired in the sense that the resistance set up by the collision of one electron is precisely offset by the rebound of its partner from a simultaneous collision, so that no net resistance to the current is set up. At temperatures above the transition point or in magnetic fields of greater than critical strength these electrons become unpaired and their collisions are no longer self-canceling, but additive, and hence electrical resistance is restored.

The crossed film gate utilizing this phenomenon is constructed of a gate element crossed by one or more control elements that are separated from each other and from the gate element. The control elements may be constructed of lead wires separated from each other so that the magnetic field of each separately controls the switching of the gate element. In operation, the complete device is immersed in a cryostat for maintaining a temperature that is lower than the critical transition temperature of the gate element. The cryostat may consist of a suitable container for holding the cryogenic materials in a liquid helium bath. A more detailed cryostat utilizing a double walled container in which the inner container holds the element in contact with the cryogenic materials and the outer walls hold a source of liquid nitrogen is fully described in a U.S. Patent 2,832,897, issued on Apr. 29, 1958, to Dudley A. Buck. For the embodiment described, the gate element may be constructed of tin, which has a critical temperature of 3.7 degrees Kelvin. The control elements may be constructed of lead having a critical temperature of approximately 7.2 degrees Kelvin, which is substantially higher than the temperature of the cryostat. The uniqueness of the cryogenic device is the apparent infinite ratio existing between the resistive state and the superconductive state. This high ratio permits many inputs with no attenuation of signals.

In future discussions concerning the switching of a cryogenic device it will be assumed that the gate element is switched from a superconductive state to a resistive state upon the passing of current in the associated control element. The control current will always be assumed to be of sufficient value for effecting the desired switching action in the gate element. Those situations requiring a different value of control current will be specifically pointed out and described.

Figure 2:
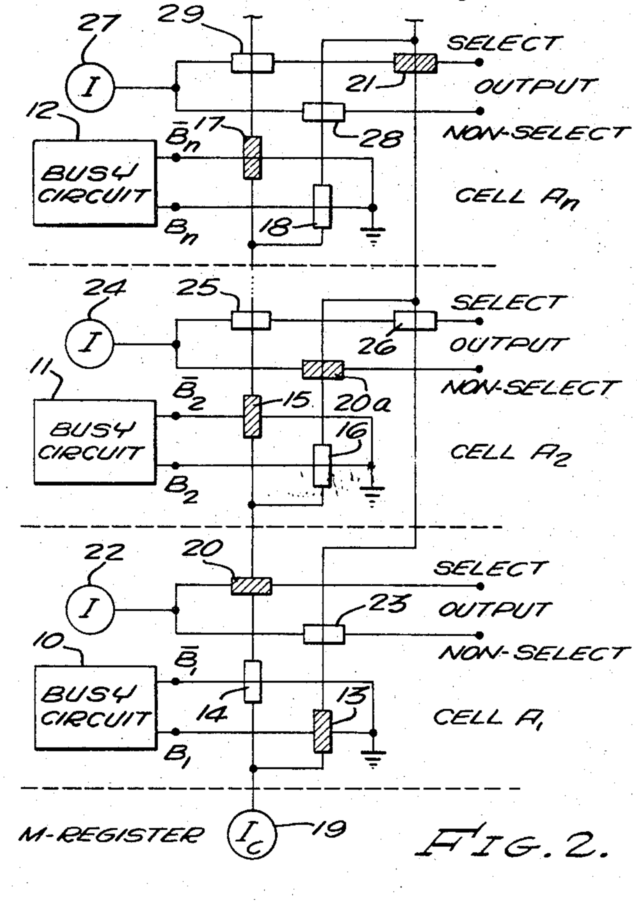
FIG. 2 is a schematic diagram of a switching network suitable for selecting the first available memory cell.

Referring now to FIG. 2, there is shown a simplified schematic diagram illustrating how the control signals from the M register seek out and identify the first empty cell preparatory to the writing of information. The first empty memory cell is identified as that available memory cell closest to the M register. For purposes of illustration, three control modules representing three individual memory cells $A_1$, $A_2$, and $A_n$, are shown. The selection of the first empty cell will be explained by assuming memory cell $A_1$ is full and that memory cells $A_2$ and $A_n$ are empty, which thereby identifies memory cell $A_2$ as the first empty cell. Associated with each control module of each memory cell are busy circuits 10, 11, and 12, each arranged to generate a signal on the $\overline{B}$ line if the individual memory cell is empty and hence available, or on the B line if the memory cell is full and hence unavailable. According to the original assumption, busy circuit 10 will generate a signal on the $B_1$ line thereby switching device 13 into the resistive state as indicated by the crosshatched lines, and leave device 14 which is in the $\overline{B}_1$ line superconductive. The busy circuit 11 will generate a signal on the $\overline{B}_2$ line, since it is available, and hence switch device 15 into a resistive state, leaving device 16 which is in the $B_2$ line superconductive. It will be observed that every busy circuit will generate a signal either on the B or $\overline{B}$ line depending on the availability of the memory cell. Similarly, busy circuit 12 will generate a signal on the $\overline{B}_n$ line, thereby switching device 17 resistive and leaving device 18 superconductive. The current from source 19 is fed to all memory cells and is selectively directed by the individual outputs of each busy circuit. With the devices set up as indicated, current from the source 19 will prefer the path comprising the superconductive gate of device 14, the control element of device 20, the superconductive gate of device 16, the control element of device 20*a* and the control element of device 21 of the *n*th cell, after which the current is returned to the current source 19 to complete the direct current path. Consideration of the current path just traversed will show that the gate element of devices 20, 18, and 21 will switch into a resistive state. In memory cell $A_1$ a current source 22 feeds an output line labeled Select which consists of device 20, and an output line labeled Non-Select which consists of device 23. Since device 20 is resistive and device 23 is superconducting, an output signal will appear on the Non-Select line indicating that memory cell $A_1$ is not available. A similar analysis for memory cell $A_2$ will show that a path is available from a current source 24 and out the output line labeled Select thereby indicating that cell $A_2$ is the first available memory cell. Cell $A_n$, which is representative of all empty cells after the first available cell will generate a current signal on the Non-Select output line thereby indicating that the $A_n$-th memory cell is not the first empty cell. It can be seen, therefore, that only one memory cell will be chosen as the first available memory cell ready to receive information.

Figure 3:
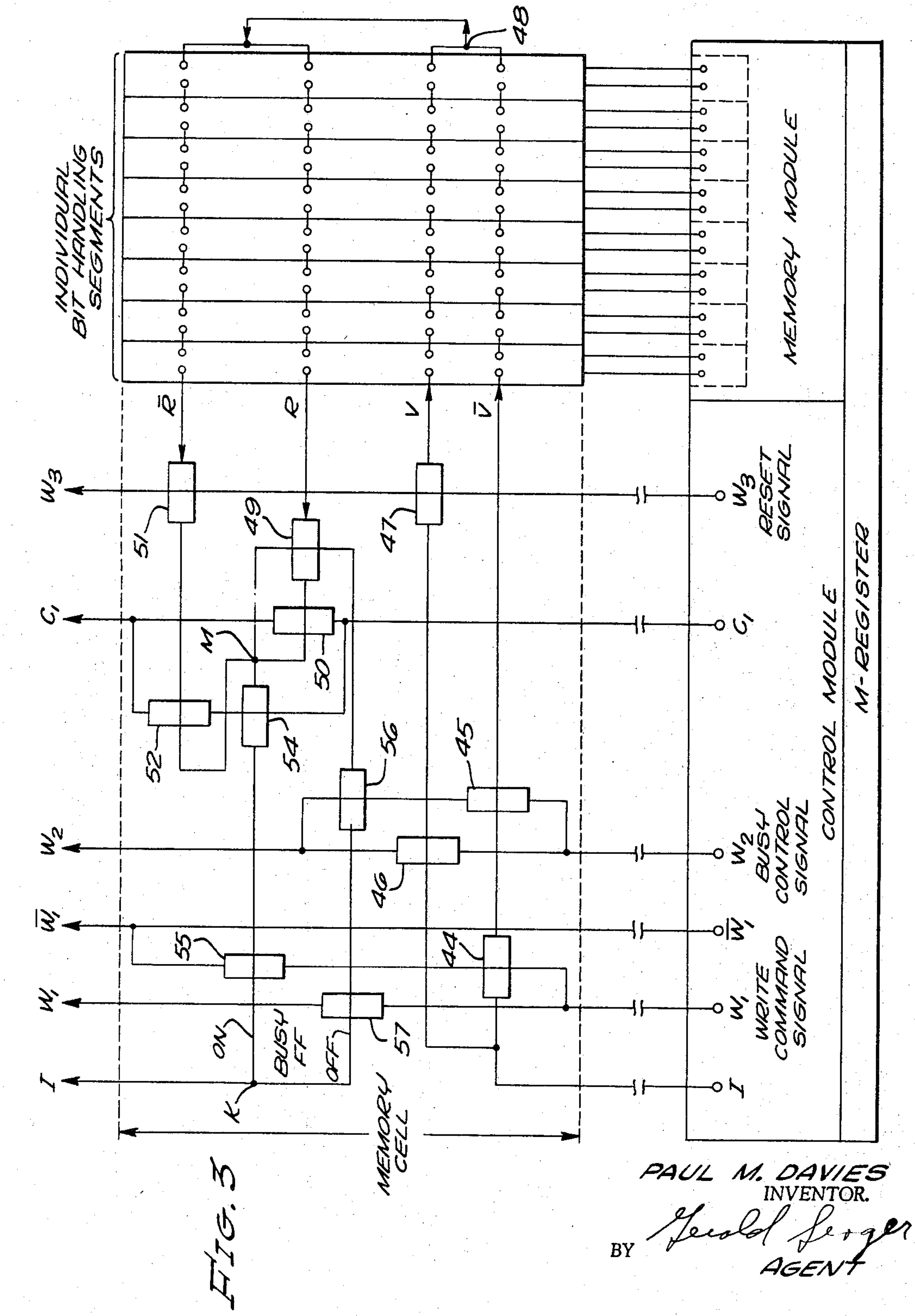
FIG. 3 is a schematic diagram of a control module illustrated in FIG. 1.

Referring now to FIG. 3, there is shown a schematic diagram illustrating a control module and its functional cooperation with the M register and associated memory module. The input lines identified as I, $W_1$, $\overline{W}_1$, $W_2$, $C_1$, and $W_3$ all originate in the control module of the M register and sequentially connect all control modules of every memory cell.

The I line supplies a direct current from a suitable source located in the M register. Current from the I line may pass either through devices 44 and 45 and out the $\overline{V}$ line into the memory module or through devices 46 and 47 and out the V line and into the memory module. As will be explained in connection with FIG. 4, the memory module writing operation is controlled by current appearing on the V line and is not affected by current appearing on the $\overline{V}$ line. The V and $\overline{V}$ output lines from the memory module are joined together as indicated by reference 48 and are connected together to form the current source for the R and $\overline{R}$ lines of the same memory module. Current on the R line indicates a matched or selected memory cell, whereas current in the $\overline{R}$ line indicates a nonselected memory cell. Current on the R line would pass through devices 49 and 50 to a junction identified as point M. Current on the $\overline{R}$ line would flow through devices 51 and 52 to point M. It will be recognized that regardless of the current path selected the total direct current will appear at point M. From point M to the junction identified as point K on output line I, the current again has a choice of two paths which together form a busy flip-flop. By definition we have assumed that current flowing in a first path from point M to point K comprising devices 54 and 55 will represent the ON condition which indicates that the memory cell is not available for the storing of new information. A second path from point M to K of the busy flip-flop comprises devices 49, 56, and 57 and represents the OFF condition indicating that the memory cell is available for the storing of new information. At point K the direct current is again combined and is directed to the next control module of the next memory cell in the same manner as described for the present control module.

A description of the various operations performed by the control module of each memory cell will now be given. It will be assumed that the present memory cell is available for the storage of information and that it is the defined first memory cell. To satisfy this assumption, the busy flip-flop must be OFF thereby causing current to flow from M through device 49, device 56, and device 57 to point K. In this state the gate elements of devices 49 and 57 will be switched resistive. Considering now a writing operation, it is necessary for the M register to generate a write command signal on line $W_1$. Since device 57 is resistive the write command signal will be diverted through devices 44 and 55 and back into the $\overline{W}_1$ line. The $\overline{W}_1$ line is actually a return line for the current signal appearing on the $W_1$ line. The current pulse on line $W_1$ will therefore switch device 44 into a resistive state and cause the direct current from line I to select the alternate path consisting of devices 46 and 47 and the V line. This direct current will switch device 46 resistive and supply the necessary control in the associated memory module for causing a writing operation. The direct current will pass through the memory module and reappear at point 48 where it becomes the current source for either the R or $\overline{R}$ line for the same memory module. The exact path followed by the direct current will become apparent after the signals developed on lines $W_2$ and $W_3$ are explained. In time sequence and subsequent to the current pulse appearing on line $W_1$, a current pulse termed a busy control signal is generated in the M register and transmitted on line $W_2$ in order to turn the busy flip-flop of the selected memory cell into an ON condition to indicate that the memory cell is not available for the storage of information. Since device 46 is resistive, the current pulse on line $W_2$ will flow through device 45 and device 56 thereby switching device 56 resistive. As mentioned previously, device 56 is in the OFF path of the busy flip-flop and has the effect of switching the flip-flop so that current appearing at point M will now flow through devices 54 and 55 thereby switching device 55 resistive. A subsequent write command signal generated on line $W_1$ will find device 55 resistive and device 57 superconductive and will therefore pass unaffected to the next control module. In time sequence and subsequent to the pulse appearing on line $W_2$, a current pulse, termed a Reset Signal, is generated in the M register and transmitted on line $W_3$ to all control modules. The Reset Signal will switch device 47 and 51 resistive. The switching of device 47 resistive prevents the direct current on line I from flowing out the V line, and consequently the direct current is forced to flow out the $\overline{V}$ line through devices 44 and 45 causing device 45 to become resistive. A subsequent busy control signal generated on line $W_2$ will henceforth find device 45 resistive and device 46 superconductive and will therefore pass through the control module and on to the next control module. The reset signal on line $W_3$ also switches device 51 resistive which thereby prevents current flowing in either the V or $\overline{R}$ line. Device 51 therefore insures that the current will flow through the R line and through devices 49 and 50 to point M, which, of course, will switch device 50 resistive. The current path from point M to K will be the ON path of the busy flip-flop consisting of devices 54 and 55. The current paths just traversed indicate how a write command signal is generated and directed into the V line and also how the busy flip-flop is turned ON to indicate to subsequent interrogating pulses that this particular memory cell is now no longer available for the storing of information.

Consider now a reading operation in which key information in the memory module of the M register is communicated to all memory modules for the purpose of identifying a particular stored record. The comparing of transmitted key information and stored key information will be disclosed in connection with the description accompanying FIG. 4. However, at this point it is necessary to understand that a true comparison in the memory module will produce a superconductive path in the R line whereas a false comparison produces a resistance in the R line which causes the current to flow in the $\overline{R}$ line. Consequently, all memory modules except the desired one which contains the stored record will generate a resistance in the R line thereby causing the direct current to flow to the $\overline{R}$ line which indicates that a true comparison has not been made. Prior to the reading operation, it is necessary to generate a reset signal on the $W_3$ line to insure that the direct current in all memory modules will be directed initially to the R line. Since only one memory cell can be chosen, a resistance will be placed in the R line of every memory module except the one containing the desired record. The selected memory module will therefore pass current on the R line through devices 49 and 50 to point M, and from point M to point K through the ON path consisting of devices 54 and 55. Current on the R line will cause a nondestruct read-out of the information contained in the memory module of the selected memory cell into the memory module of the M register. The purpose of devices 49 and 50 will be explained in connection with the clearing operation.

The technique for clearing a memory cell is simply to identify the information contained in the memory cell and to then turn off the busy flip-flop associated with that memory cell to thereby indicate that the memory cell is again available for the storing of information. In clearing a record, key information is transmitted from the memory module of M register to all memory modules of the memory block in a similar manner as described in connection with the reading operation. In the selected memory module current will appear on the R line and pass through devices 49 and 50 thereby making device 50 resistive. A clear command signal is generated in the M register and directed on line $C_1$ to all control modules. In those selected control modules receiving a current on line R device 50 will be resistive thereby causing the clear command signal to flow through devices 54 and 52 out into the next control module. The effect of device 50 being resistive in all selected control modules will be the same, and that is to switch device 54 resistive and reset the busy flip-flop into the OFF condition. It will be observed that device 52 is placed in the $\overline{R}$ line to prevent a clear command signal from switching the busy flip-flop in a nonselected memory cell. Since a memory cell is cleared by simply switching the busy flip-flop, it is possible that by chance an obsolete record stored in the memory module may compare with information transmitted by the memory module of the M register. The effect of this would be to produce a current on the R line of an empty cell, however, by placing device 49 in the OFF path of the busy flip-flop, the current flowing on the R line will be impeded and caused to flow on the $\overline{R}$ line in the same manner as if a false comparison had occurred. It will be pointed out in more detail later that a nonunique key may be used in clearing if it should be desirable to clear a complete class of records stored in a plurality of memory cells. This would simply mean that in all of those selected memory cells current would appear on line R.

Figure 4:
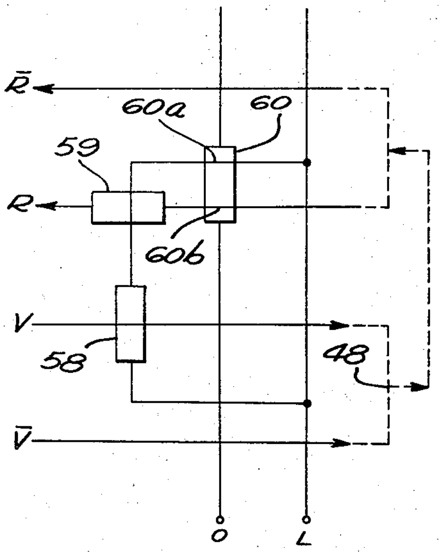
FIG. 4 is a schematic diagram of an individual bit handling segment a number of which comprise the memory module illustrated in FIGS. 1 and 3.

Referring now to FIG. 4, there is illustrated an individual bit handling segment of the kind that makes up the memory module. Each memory module of every memory cell is composed of a plurality of identical bit handling segments illustrated in FIG. 4. As mentioned in connection with FIG. 3, the V and $\overline{V}$ lines originate in the control module and are connected to the highest order bit handling segment in the memory module. The $\overline{V}$ and V lines are connected sequentially to each bit handling segment comprising the memory module and then connected together to form the input current source for the R and $\overline{R}$ lines. The vertical lines L and O originate in the memory module of the M register and are sequentially connected to similar individual bit handling segments of each memory module comprising the memory block. The information signal is fed on line L during the writing operation. The direction of the current pulse represents the information in the binary form, for example, it can be assumed that current moving up line L will represent a binary 1 and current moving down line L will represent a binary 0. The L line serves a dual purpose in that key information uniquely identifying the record may also be transmitted on line L when that particular bit handling segment is used for keying. It will be pointed out later how the mere selection of line L for the transmitting of key information will determine the use of the segment. Nonselection of any line L automatically causes that segment to read-out stored information on line O during the read operation. The O line is used in connection with the nondestruct read-out of information when the particular bit handling segment is used as a data storage segment. The bit handling segment is best understood by assuming a situation in which a bit of information is to be written. As explained in connection with FIG. 3, the control module will direct the write command signal on line $W_1$ into the V line of the selected memory cell. The V line in turn is connected to all bit handling segments comprising the memory module. A current on line V passes through the control element of device 58 thereby switching said device into a resistive state. It will be remembered that line V is sequentially connected to every bit segment in the memory module and will therefore switch every associated device into a resistive state. In considering how the informational current signal on line L is stored in the selected memory module, it is best to first consider the basic properties making up a persistor circuit. The explanation will be more readily understandable if we consider that the portion of line L in parallel with the gate element of device 58 and control element of device 59 contains more inductance than the parallel gate element path. The choice of inductances is governed primarily by optimum speed requirements of the disclosed system. Where speed is not effective the choice of inductance may differ as required by other parameters of the system. The information current signal on line L will initially prefer the parallel path of devices 58, 59 and control element 60$a$ of device 60 since it is of lower inductance than line L. The gate element of device 58 having been switched into a resistive state by a signal on line V will introduce an IR drop which will cause the current to transfer to line L. Eventually, therefore, the complete information current will flow through the higher inductance path in line L and completely bypass the parallel gate element of device 58. It must be remembered that in all other memory cells the gate corresponding to device 58 will be superconducting, and hence the current path will consist of the low inductance path of the gate circuit and not the higher inductance path on line L. The informational current is stored by first removing the write command signal on line V and then removing the information current signal on line L. When the current in line L is removed, a voltage develops across the nodes of the persistor which causes a redistribution of the current in the two parallel paths which make up the persistor. The current in the highly inductive path will tend to remain constant. The current in the other path will change in such a way as to cause a total current of zero in line L. The result will be a persisting circulating current in the persistor loop. Its direction will be counterclockwise to represent a binary 1 and clockwise to represent a binary 0, as determined by the direction of the original information current in line L. The absolute value of the information current on line L is chosen to produce a circulating current in the persistor of approximately two-thirds the critical control current value necessary to switch the gate element of device 59 from a superconductive to a resistive state. The circulating current by itself will therefore be insufficient to switch device 59 resistive. If, for example, we assume an infinite ratio between the high inductance path on line L and the low inductance path around the loop, then the value of the circulating current within the persistor loop will be the same as the value of information current delivered on line L.

All individual bit handling segments store information comprising the record. In addition there are two possible modes of operation for each segment. In one mode the segment acts as a key element and compares the stored bit of information with the transmitted bit of information on the L line. These comparisons result in the selection of the desired record for reading or clearing. In the second mode the bit segment acts as a data element capable of transmitting a stored bit of information to the M register in response to a true selection in the key bits. The first description given will explain the operation of the bit handling segment as a key element in which information is transmitted on line L from the M register and is compared with information stored in the individual segment. When used as a key element information is transmitted from the M register along line L in a manner similar to that used in writing a record. The same conventions originally adhered to are used, that is, current going up for a binary 1 and down for a binary 0. Most of this informational current will takes the path having the lower inductance which has been defined as the parallel persistor loop path. If the transmitted bit has the same value as the stored bit in a given segment, the two currents will cancel in the persistor loop path of the circuit. However, should the two currents have different binary values, they will add. Since each current equals two-thirds the critical value, the sum of the two currents will exceed the critical value of device 59 as originally set forth, device 59 will switch into a resistive state. The effect of this current on device 60 is of no consequence since device 60 is used only in the read operation. By way of review, therefore, it can be stated that if the transmitted key information is the same as the stored information, there will be no effect on device 59. However, should the transmitted information be different than the stored information, device 59 will become resistive. The producing of a single resistive gate in the R line of any memory module will immediately cause the current to select the $\overline{R}$ line thereby indicating that that memory module is not being selected. In effect only a true comparison in all key elements will produce a completely superconductive R line. Gate 59 of each individual bit handling segment not used as a key element will remain superconductive and thereby not effect the resistance of the R line.

As mentioned above, the second use of the individual bit handling segment is as a data element. By assuming that the required key information was transmitted from the M register in the appropriate number of individual bit handling segments to uniquely identify a stored record, we can assume that current will flow in the R line of the selected memory module. If the current flowing in line R through gate 60$b$ of device 60 is in the same direction as the circulating current flowing through the gate 60$a$, then device 60 will be switched resistive. In the alternative, if the direction of the current in line R is opposite to the circulating current, then device 60 will remain superconductive. The only condition that can cause the sum of control currents in device 60 to exceed the critical value is for current to exist in the R line and to have the same direction as the circulating current. By a proper choice of the direction of the current in the R line, device 60 will become resistive if, and only if, that particular memory cell is selected and that particular individual bit handling segment contains a binary 1. The resulting resistance or superconductivity existing in line O is detected by read amplifiers in the memory module of the M register. These amplifiers are connected to each line O for each individual bit handling segment. For example, a binary 1 is detected by the presence of a voltage across a single resistive O line, whereas a binary 0 is detected by the absence of a voltage developed across the superconductive line.

Figure 5:
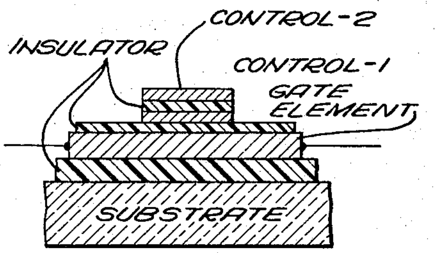
FIG. 5 is a cross sectional view of a dual control gate element illustrated in FIG. 4.

Referring now to FIG. 5, there is shown a cross section of a dual control device having two control elements, such as device 60 illustrated in FIG. 3. The device is usually built on a suitable substrate material that is covered by a thin film of insulating material. The gate element is bonded to the insulating material, and a second insulating film covers the gate element. The first control element is bonded on the insulator film and may be placed longitudinally or transversely with respect to the gate element. The first control element is covered by a third layer of a thin insulating film and the second control gate is bonded to said third layer of insulating material. Both the first and second control elements are placed in the same plane and are made as identical to each other as possible. When the currents in both control elements are in the same direction, the magnetic fields add and thereby switch the gate element from a superconductive state to a resistive state. The current levels in either of control elements 1 or 2 may be chosen so that either control element can switch the gate element, or, as in the example just described, the magnetic fields of both elements must combine to switch the gate element. The geometry of the two control elements is such that the associated gate element will be switched resistive if the control currents in the control elements are in the same direction, and, conversely, the gate element will remain superconductive if the control currents are in opposite directions.

Figure 6:
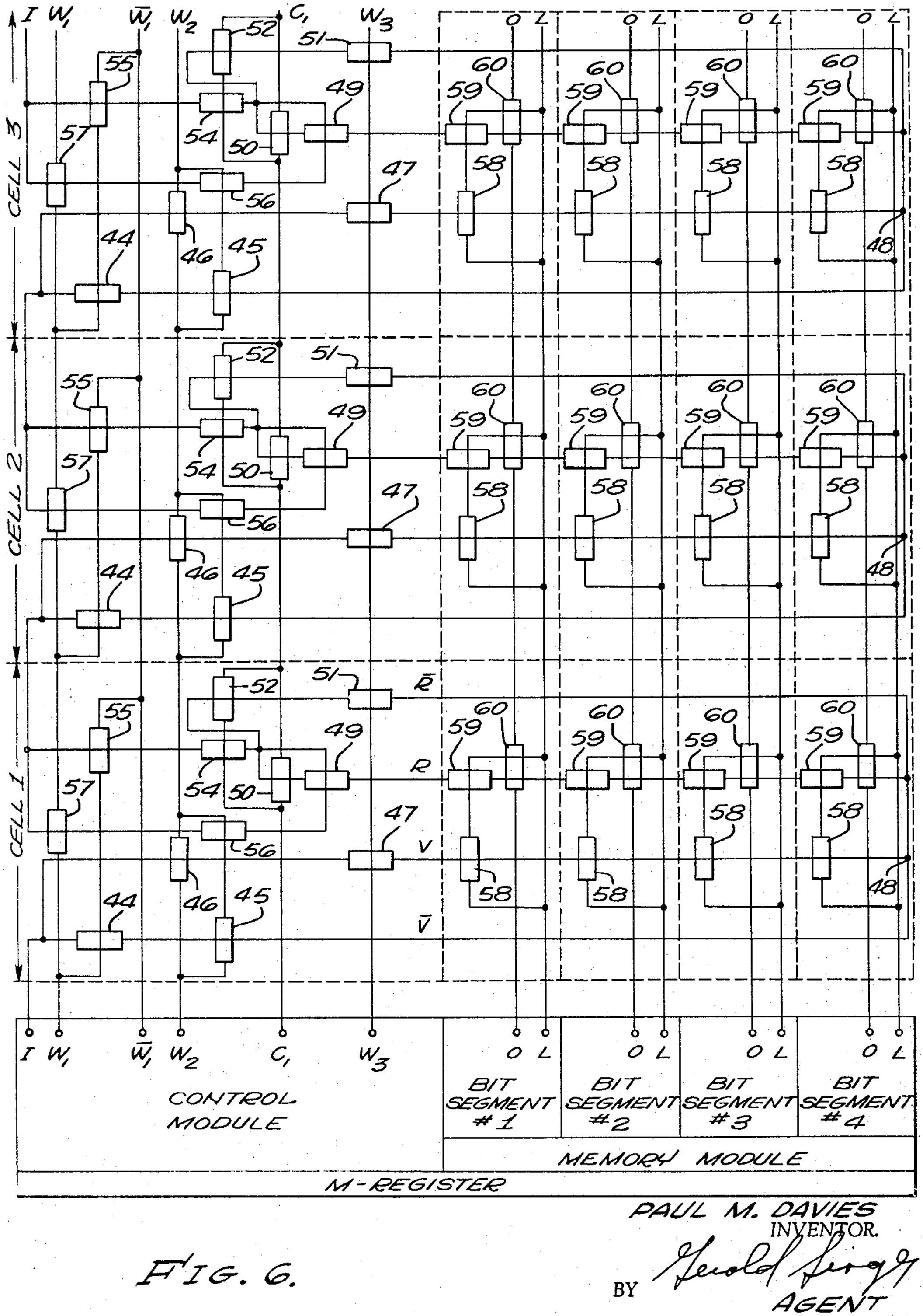
FIG. 6 is a schematic diagram of a memory storage device illustrated in FIG. 1 and utilizing the control modules of FIG. 3 and the memory modules comprised of memory segments illustrated in FIG. 4.

Referring now to FIG. 6 there is illustrated a complete memory block comprising three memory cells, identified as cell 1, cell 2, and cell 3. For the purpose of illustrating the operation of the disclosed memory block we will assume that cell 1 and cell *n* are full of information, and hence the busy flip-flop in each control module will be ON. We will assume further that cell 2 is available for the storage of information, and hence the busy flip-flop will be OFF. The record handling capabilities of this system are limited to four independent bit handling segments identified as bit segments 1, 2, 3, and 4. The information stored in the individual bit segments 1, 2, 3, and 4 comprising the memory module of cell 1 will be assumed to be a binary 1, a binary 1, a binary zero, and a binary zero respectively. The information stored in the segments 1, 2, 3, and 4 comprising the memory module of cell *n* will be assumed to be a binary zero, a binary zero, a binary 1, and a binary 1 respectively.

In keeping with the original assumptions set forth earlier in describing the individual memory modules it will be recalled that a binary 1 is represented by a circulating counterclockwise current within the persistor circuit defined by device 58 located in the individual memory modules. The binary 0 is, of course, represented by a clockwise circulating current within the persistor circuit. The operation of the system will now be described by illustrating a writing operation in which the individual bit handling segments 1, 2, 3, and 4 comprising the memory module of the M register will transmit a binary 0, a binary 1, a binary 1, and a binary 0 respectively into the memory modules for storage. In time sequence a write command signal is applied on line $W_1$ of the M register. This signal will pass through device 57 of cell 1 which is superconductive and continue to cell 2. In cell 2 the busy flip-flop is off, and hence device 57 is resistive, causing the write command signal to pass through device 44 and device 55 to the $\overline{W}_1$ line. This action will cause device 44 of cell 2 to switch resistive and direct the current on line I feeding cell 2 to pass through device 46 and 47 and out the V line.

Since the V line is connected to all control elements of device 58 it will be apparent that each device 58 in every bit handling segment in cell 2 will be switched resistive. As mentioned previously, informational current from the memory module of the M register is transmitted on each W line in accordance with the convention that a binary 1 current is directed up the L line and a binary zero current down the L line. This information current on line L will not be affected by either of cell 1 or cell 3 but only by cell 2, since current in the V line of cell 2 has caused each device 58 to be resistive, thereby directing the current within the persistor circuit as previously described in connection with FIG. 4.

By way of review, the busy flip-flop in cell 1 is ON thereby making device 55 resistive and device 57 superconductive. As a result the write command signal on line $W_1$ will freely pass through device 57 to cell 2. The direct current on line I for all memory cells will be directed on the $\overline{V}$ line due to the preceding reset signal on line $W_3$. The reset signal is a single current pulse of sufficient amplitude and duration to cause the associated devices 47 and 51 on line $W_3$ to be switched resistive. At the termination of the reset pulse, the associated devices return to their superconductive state. Subsequent operations will not change the flow of the direct current from the $\overline{V}$ line into the V line even though both lines are superconductive, unless, of course, an impedance in the form of a resistive device is placed in either of the lines. As a result, the direct current in all memory cells will flow out the $\overline{V}$ line with the exception of cell 2 in which the current will be switched into the V line by the action of device 44 being switched resistive.

After the information is written into memory cell 2 a busy control signal on line $W_2$ is transmitted. This signal will pass through device 46 of cell 1 since device 45 is resistive and device 46 is superconductive. However, in cell 2 device 46 is resistive and device 45 superconductive, thereby causing the signal to be bypassed through device 45 and 56 and out the $W_2$ line to cell *n*. The effect of the busy control signal being bypassed is to switch device 56 resistive thereby resetting the busy flip-flop in cell 2. As mentioned previously, a reset signal is transmitted on line $W_3$ to reestablish the D.C. current in lines $\overline{V}$ and R preparatory to the next operation.

In table form the information stored in the individual bit handling segments comprising the individual memory modules for each memory cell is as follows:

TABLE I

| Memory cell | Bit handling segments | | | |
|---|---|---|---|---|
| | No. 1 | No. 2 | No. 3 | No. 4 |
| Cell 3 | 0 | 0 | 1 | 1 |
| Cell 2 | 0 | 1 | 1 | 0 |
| Cell 1 | 1 | 1 | 0 | 0 |

In order to read information stored in any of cells 1, 2 or 3, it is necessary to select those bit handling segments that uniquely identify the stored information wanted. A review of Table I will show the information contained in cell 3 may be uniquely identified in a number of ways, for example, by segments 1 and 2, 2 and 3, 3 and 4, 1 and 4, and 2 and 4, just to mention only combinations of two. A similar analysis can be made for the information contained in cell 2 and cell 1. In order to illustrate the reading operation we will assume the information contained in cell 3 is desired and that our key uniquely identifying the stored record is the information that bit handling segments 1 and 2 each contain a binary 0. Prior to reading, a reset signal is generated and transmitted on line $W_3$ to insure that direct current will flow on all $\overline{V}$ lines and on all R lines in every memory cell. The selection of information key current on line L in both segments 1 and 2 will have the effect of switching at least one device 59 resistive in every memory cell but the selected one. The result is that only one line R will remain superconductive after the information key current is transmitted and that the memory cell containing the superconductive line R will contain the desired information. In all nonselected memory cells line R will become resistive thereby causing the current to flow through line $\overline{R}$.

In those memory cells containing a binary 1, the circulating current, and the informational current will add causing device 59 to become resistive. An analysis of the conditions now existing in cell *n* will show that device 59 in segment 1 and device 59 in segment 2 are superconductive.

In cell 2 it can be shown that device 59 in segment 1 is superconductive, whereas device 59 in segment 2 is resistive. In cell 1 device 59 in segment 1 and device 59 in segment 2 will both be resistive. With respect to segments 3 and 4 in which no information current was transmitted on line L, the device 59 in both segments 3 and 4 will remain superconductive.

As mentioned previously the direction of current on line R is chosen so that circulating current representing a binary 1 in the persistor circuit of the individual segment combines with the current in the R line to switch the dual control device 60. This, of course, will occur only in segments 3 and 4 of cell *n*. The state of resistance of gate 60 in segments 3 and 4 is determined by read amplifiers in every line O in the M register. The read amplifiers connected to the O lines of segments 3 and 4 will detect a resistance on line O, thereby indicating a binary 1 was stored in segments 3 and 4 of cell 3.

The clearing operation is best explained by assuming that a class of cells identified as those having a binary 0 in segment 1 and a binary 1 in segment 3 are to be cleared in the memory block. A review of Table I will show that such a class consists of cells 2 and *n*. The operation of clearing is very similar to that of reading in that current representing a binary 0 is transmitted on line L of segment 1 and current representing a binary 1 is transmitted on line L of segment 3. Cells 2 and *n* will compare thereby making line R superconducting in both cells whereas in cell 1 line R will become resistive. Simultaneously, a clear command signal is transmitted from the M register on line $C_1$ and will pass through device 50 of cell 1 and be bypassed in cell 2 through device 54 and device 52, and similarly in cell *n* will be bypassed through devices 54 and 52.

As previously described, this action will reset the busy flip-flop circuit from the ON condition to the OFF condition for both cells 2 and *n*, thereby indicating to future write command signals appearing on line $W_1$ that cells 2 and *n* are now available for storage of information. The illustration of clearing just given very graphically shows how more than one record may be cleared at one time by utilizing nonunique key information.

This completes the descriptions of the embodiments of the invention disclosed and illustrated here. However, many modifications and advantages will be apparent to persons skilled in the art without departing from the spirit and scope of this invention. A review of the present invention as compared to the previously referred to copending invention will indicate that the functions of key and data have now been consolidated into a single unit which can serve in either role, depending only upon the signals impressed upon the L line in the M register. In fact, any bit handling segment in any of the memory cells can serve in different roles from one read operation to the next. The *L/R* time constant of the present invention is improved by a factor equal to the number of bits used in the key portion of the referenced application, since in the present invention a word of record is selected for reading or clearing by the absence of resistance in the R line. Therefore, it is only necessary to detect the resistance of one of a number of gates connected in series. In the previously referenced application the comparing line was connected to a number of gates in parallel, thereby making it necessary to detect the resistance of a parallel combination in which all resistive gates are in parallel. Accordingly, it is desired that this invention not be limited to the particular details of the embodiments disclosed except as defined by the appended claims.

The embodiments of the invention in which an exclusive property or privilege is claimed are defined as follows:

1. In combination, a superconducting memory cell comprising a memory module having a plurality of individual bit handling segments, each bit handling segment having a single input line for writing information and a single output line for reading information, said module comprising a plurality of bit handling segments, each comprising a first device having a single control and gate element, a second device having a single control and gate element, and a third device having dual controls and a gate element, said gate element of said first device, said control element of said second device and one control element of said third device being connected in series loop to form a persistor circuit, said persistor circuit being connected across said input line for receiving a binary variable input signal, said control element of said first device adapted to be connected to a write control signal, said gate element of said second device being connected in series with a second control element of said third device, said gate element of said third device being located in said output line for indicating the binary value of the circulating current stored in said persistor circuit, a control module adapted to receive operational signals for controlling said memory module, and means for reading out said stored information from all segments.

2. In combination, a memory module having a plurality of individual bit handling segments, each bit handling segment having a single input line for writing information and a single output line for reading information, a persistor circuit connected to said input line for storing information in the form of a circulating current, said persistor circuit being responsive to interrogating signals for generating a zero current in a portion of said persistor loop in the presence of a true comparison between said circulating current and said interrogating signal, a dual control superconductive device responsive to said zero current for indicating a true comparison, and a superconducting device located in said output line responsive to said detecting line and current in said persistor circuit for reading information into said output line.

References Cited

UNITED STATES PATENTS

| | | | |
|---|---|---|---|
| 2,904,781 | 9/1959 | Katz | 340—146.1 |
| 2,967,294 | 1/1961 | Moerman | 340—146.2 |
| 3,031,586 | 4/1962 | Anderson | 340—173.1 |
| 3,031,650 | 4/1962 | Koerner | 340—174 |

OTHER REFERENCES

Rosin, IBM Technical Disclosure Bulletin, Associative Memory, vol. 3, No. 10, March 1961, pp. 120–122.

Kiseda et al., IBM Journal, A Magnetic Associative Memory, April 1961, pp. 106—121.

TERRELL W. FEARS, *Primary Examiner.*

U.S. Cl. X.R.

340—172.5, 146.2